United States Patent
Schiatti et al.

(10) Patent No.: US 11,303,448 B2
(45) Date of Patent: Apr. 12, 2022

(54) DECENTRALIZED FEDERATED LEARNING SYSTEM

(71) Applicant: Accenture Global Solutions Limited, Dublin (IE)

(72) Inventors: Luca Schiatti, Juan-les-Pins (FR); Anh-Dung Le, Antibes (FR); Giuseppe Giordano, Antibes (FR); Haris Pasic, Biot (FR)

(73) Assignee: Accenture Global Solutions Limited, Dublin (IE)

( * ) Notice: Subject to any disclaimer, the term of this patent is extended or adjusted under 35 U.S.C. 154(b) by 361 days.

(21) Appl. No.: 16/551,601

(22) Filed: Aug. 26, 2019

(65) Prior Publication Data

US 2021/0067339 A1   Mar. 4, 2021

(51) Int. Cl.
*H04L 29/06* (2006.01)
*H04L 9/32* (2006.01)
(Continued)

(52) U.S. Cl.
CPC ............ *H04L 9/3213* (2013.01); *G06F 16/27* (2019.01); *G06N 20/00* (2019.01); *H04L 9/006* (2013.01);
(Continued)

(58) Field of Classification Search
CPC ..... H04L 9/3213; H04L 9/006; H04L 9/0637; G06F 16/27; G06N 20/00
See application file for complete search history.

(56) References Cited

U.S. PATENT DOCUMENTS 10,621,164 B1 * 4/2020 Kain .................. G06F 16/2365
2018/0181979 A1   6/2018 Frank et al.
(Continued)

FOREIGN PATENT DOCUMENTS

WO   WO 2019/082100 A1   5/2019

OTHER PUBLICATIONS

Besir Kurtulmus, et al., "Trustless Machine Learning Contracts; Evaluating and Exchanging Machine Learning Models on the Ethereum Blockchain," CORR (ARXIV), Feb. 27, 2018, pp. 1-11.
(Continued)

*Primary Examiner* — Mahfuzur Rahman
(74) *Attorney, Agent, or Firm* — Crowell & Moring LLP

(57) ABSTRACT

A participant node of a distributed ledger network may identify a distributed federated learning (DFL) smart contract stored on a blockchain. The DFL smart contract may include an aggregation sequence. The aggregation sequence may include an ordered sequence of participant node identifiers. The participant node may generate a trained model by training a global model with training data. The participant node may detect, on the blockchain, a first transition token indicative of a first model previously aggregated by another participant node. The participant node may receive the first model. The participant node may aggregate the first model with the trained model to generate a second model. The participant node may store, on the blockchain, a second transition token indicative of the second model. A successor node identified in the aggregation sequence may further aggregate the second model with an additional model in response to detection of the second transition token.

20 Claims, 12 Drawing Sheets

(51) Int. Cl.
  *G06F 16/27* (2019.01)
  *G06N 20/00* (2019.01)
  *H04L 9/00* (2022.01)
  *H04L 9/06* (2006.01)

(52) U.S. Cl.
  CPC ........ *H04L 9/0637* (2013.01); *H04L 2209/38* (2013.01)

(56) References Cited

U.S. PATENT DOCUMENTS

| | | | |
|---|---|---|---|
| 2018/0285839 A1 | 10/2018 | Yang et al. | |
| 2018/0365201 A1* | 12/2018 | Hunn | H04L 9/3239 |
| 2019/0236598 A1 | 8/2019 | Padmanabhan | |
| 2020/0034749 A1* | 1/2020 | Kumar | G06F 16/93 |
| 2021/0056211 A1* | 2/2021 | Olson | G06N 20/00 |
| 2021/0073291 A1* | 3/2021 | Hunter | G06F 16/9024 |
| 2021/0357819 A1* | 11/2021 | Levacher | G06N 20/20 |
| 2021/0358032 A1* | 11/2021 | Celia | G06Q 50/01 |
| 2021/0360070 A1* | 11/2021 | Celia | H04L 41/0809 |

OTHER PUBLICATIONS

Extended European Search Report for corresponding European Application No. 20187465.8, dated Oct. 2, 2020, 13 pgs.

Kan Luo, et al., "A Multiple Blockchains Architecture On Inter-Blockchain Communication," 2018 IEEE International Conference on Software Quality, Reliability and Security Companion, IEEE, Jun. 20, 2018, pp. 139-145.

Leonidas Georgopoulos, et al., "Distributed machine learning in networks by consensus," Neurocomputing, vol. 124, Apr. 8, 2013, pp. 2-12.

Ravi Kiran Raman et al., "Trusted Multi-Party Computation and Verifiable Simulations: A Scalable Blockchain Approach," dated Sep. 22, 2018, pp. 1-16, published online by Cornell University at URL https://arxiv.org/pdf/1809.08438.

Muhammad Shayan et al., "Biscotti: A Layer for Private and Secure Peer-to-Peer Machine Learning," Computer Science, dated Dec. 12, 2019, pp. 1-20, published online by Cornell University at URL https://arxiv.org/pdf/1811.09904.pdf.

* cited by examiner

DECENTRALIZED FEDERATED LEARNING SYSTEM

TECHNICAL FIELD

This disclosure relates to machine learning and blockchain technology, and, in particular, federated learning and distributed blockchain networks.

BACKGROUND

Rapid advances and the rise in popularity of machine learning has resulted in growing demand to improve training capabilities. Federated learning involves the distributed training of a machine learning model across multiple computer systems. The computer systems may separately train the machine learning model based on unique sets of private data accessed by the computer systems. While federated learning may boost model performance by widening the amount of available training data, federated learning is currently prone to various problems including bottlenecks, high-bandwidth, data security threats, technical challenges and other inefficiencies.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
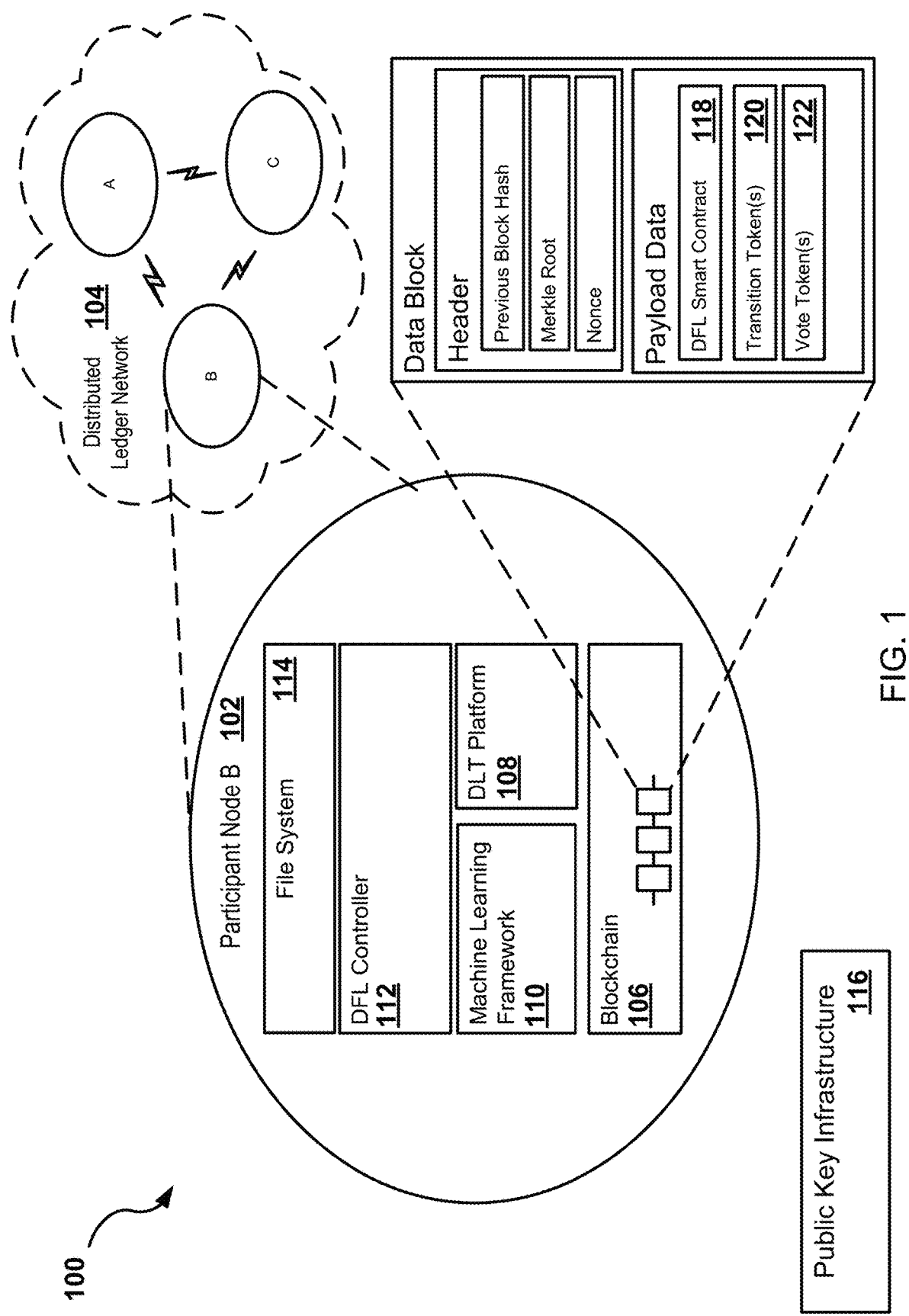
FIG. 1 illustrates a first example of a system.

The distributed nature of federated learning creates technical challenges to achieving secure and efficient training of machine learning data by multiple computer systems. For example, malicious actors in federated learning may poison training data, reducing or corrupting performance of a global model. Centralized servers may demand high bandwidth to perform aggregation, creating bottlenecks that inhibit or slow a training process. Slower training ultimately results in less training in a given period or cycle and, thus, less accurate machine learning models. Moreover, failures by a central server may create a single point of failure in a federated learning process. In addition, the distributed nature of federated learning creates security vulnerabilities for personal or sensitive data accessed to train models.

Accordingly, systems and methods for distributed federated learning using blockchain technologies are provided. By way of an introductory example, a participant node of a distributed ledger network may identify a distributed federated learning (DFL) smart contract stored the distributed ledger. The DFL smart contract may include an aggregation sequence. The aggregation sequence may include an ordered sequence of participant node identifiers. The participant node identifiers may correspond to participant nodes of the distributed ledger network. The aggregation sequence defines the order in which participant nodes train and aggregate a model and pass the trained/aggregated model to the next node for further training/aggregation. The participant node may generate a trained model by training a global model with local private training data. In some examples, the global model may be specified by the DFL smart contract. The participant node may detect, on the blockchain, a first transition token indicative of a first model. The first model may have been previously aggregated by another participant node identified in the aggregation sequence. In response to detection of the first transition token, the participant node may receive the first model. The participant node may aggregate the first model with the trained global model to generate a second model. The participant node may store, on the blockchain, a second transition token indicative of the second model. A successor node identified in the aggregation sequence may further aggregate the second model with an additional model in response to detection of the second transition token.

An example of a technical advancement achieved by the systems and methods described herein is that distributed ledger technology may decentralize the coordination and performance of federated learning. In addition, peer-to-peer file sharing and/or network file storage may decentralize model sharing. Accordingly, a central server is not responsible for aggregating of training updates, thus removing single points of failure, high bottlenecks, and slower performance.

Another example of a technical advancement provided by the system and methods described herein is that the learning process is democratized by way of smart contract. The DFL smart contract may specify the training instructions, aggregation rules, and other aspects of training and aggregation. Each participant node of a distributed ledger network may access to the smart contract, which is validated and replicated across the nodes based on a consensus protocol for a distributed ledger technology. Nodes may participate in federated learning by joining and executing a smart contract.

Another example of a technical advancement provided by the system and methods described herein is that blockchain provides a traceability and immutability for a federated learning. For example, a blockchain record provides an immutable history in which multiple participants of a federated learning process may approve or disapprove of the training performed by other nodes. Historical transactions, such as state updates for a DFL smart contract, are recorded on the blockchain. Participant nodes may determine whether the training process adheres to the DFL smart contract and prevent malicious actors or corrupted participant nodes from corrupting the federated learning process by deviating from the rules established by the DFL smart contract.

Another example of a technical advancement provided by the system and methods described herein is that participant nodes participating in a federated learning process may maintain privacy of private training data and models. For example, the DFL smart contract may specify rules for aggregating trained models in a manner that preserves data sensitivity.

Additional or alternative technical advancements are made evident by the systems and methods described herein.

FIG. 1 illustrates a first example of a system 100. The system 100 may include a participant node 102 of a distributed ledger network 104. The participant node 102 may include a blockchain 106. The participant node 102 may communicate with other participant nodes of the distributed ledger network 104 to validate and/or synchronize the blockchain 106. The participant node 102, and the other participant nodes of the distributed ledger network 104, may include a distributed ledger technology (DLT) platform 108.

The distributed ledger network 104 may include a plurality of participant nodes that respectively communicate based on a consensus protocol to access, submit, modify, and/or remove information stored on local instances of a blockchain 106. For example, each of the participant nodes may include a full or partial copy of the blockchain 106 (e.g. a local blockchain). The participant nodes of the distributed ledger network 104 may submit transactions to the DLT platform 108. The consensus protocol of the DLT platform 108 may determine whether to append the transaction to local instances of the blockchain 106. The consensus protocol may prevent modification to previously appended or existing information in the blockchain 106. In some DLT platforms, modifications to the blockchain 106 may be prohibited unless a majority, or some other predefined portion of the participant nodes consent to the modifications.

The blockchain 106 may include datablocks that are linked according to a cryptography. The arrangement of data blocks and associations between information stored in the data blocks are established by the DLT platform 108. For example, the blockchain 106 may provide a growing, shared digital data flow, which serves as the source of truth between the participant nodes of a distributed ledger network 104. Depending on the DLT platform 108, the datablocks of the blockchain 106 may include a genesis datablock that is the global datablock of the blockchain 106. Successive datablocks may be appended to the blockchain 106 over time. The blockchain 106 may provide a chronological ledger of information. One or more of the successive datablocks may include a hash of a previous datablock, a hash of a header of the previous datablock, and/or a hash of portions of the previous datablock, depending in the DLT platform 108. Modifications to one or more datablocks in the blockchain 106 may cause inconsistencies in the hashed information stored in the successive datablocks. The inconsistencies may be detected by the participant nodes of the distributed ledger network 104.

The DLT platform 108 may include a blockchain framework. The DLT platform 108 may implement and/or validate the blockchain 106 based on consensus among participant nodes of the distributed ledger network 104. The participant node 102 may locally implement an instance of the DLT platform 108. The local instance of the DLT platform 108 may communicate with other instances of the DLT platform 108 in the distributed ledger network 104. The DLT platform 108 may cause the participant node 102 to participate in the distributed ledger network 104. For example, the DLT platform 108 may cause the participant node 102 to synchronize changes to the blockchain 106 with remote blockchain(s) on other participant nodes such that each participant node includes update-to-date blockchains. Alternatively or in addition, the DLT platform 108 may provide user interfaces, application programming interfaces (APIs), services related to management of the blockchain 106 (or blockchains).

As described herein a blockchain may include a local instance of a distributed ledger stored on a particular participant node of the distributed ledger network. The distributed ledger includes multiple blockchains replicated across multiple participant nodes of the distributed ledger network 104 and validated based on a shared consensus protocol.

The participant node 102 may include a machine learning framework 110. The machine learning framework 110 may include a framework to generate and/or train a machine learning model. For example, the machine learning framework 110 may execute a framework that implements supervised machine learning, such as, for example, Artificial Neural Network (ANN) and/or Deep Learning (DL). During training, the machine learning framework 110 may receive annotated input data. Based on the annotated input data, the machine learning framework 110 may generate a machine learning model. During implementation, the machine learning framework 110 may receive input data and a particular machine learning model. The machine learning framework 110 may generate an activation function based on the machine learning model and then apply the input data to the activation function to generate a prediction. For example, in a neural network, the machine learning framework 110 may implement an activation function that applies the weights and biases of a machine learning model to input data to determine whether a neuron passes an output to a next layer.

The machine learning model (hereinafter model), may include information that is applied to input data to predict or infer an outcome. For example, the machine learning model may be stored as a file with one or more data structures, such as a matrix, to arrange the information. The machine learning model may include learned parameters that are adjusted/trained to improve predictive performance. The learned parameters may include, for example, weights and biases. A weight may correspond to a weight assigned to a particular neuron of a neural network and the bias may correspond to a particular layer of a neural network. In other examples, the learned parameters may include other examples of information that are adjusted in a training process for machine learning.

Training a machine learning model may involve computationally intensive operations. Moreover, the performance of a machine learning model may depend on the amount and quality of training data available for training the machine learning model. With federated learning, machine learning may be applied across multiple computer systems with more immense data.

The participant node 102 may include a distributed federated learning (DFL) controller 112. The DFL controller 112 may coordinate distributed federated learning. Multiple participants of the distributed ledger network 104 may include a local instance of the DFL controller 112. Accordingly, the DFL controllers of the participant nodes may inter-communicate to perform distributed federated learning without a centralized authority.

The participant node 102 may further include a file system 114. The file system may include a storage for information. For example, the file system may include a repository, a database, a set of memory locations, and/or any other type of storage. The file system may index information, such as files. The indexed information may be queried for access. In some examples, the file system may include a peer-to-peer file system, such as an InterPlanetary File System (IPFS). For example, each participant may include a local instance of the file system 114. In peer-to-peer implementations, the participant node 102 may access a particular model from on or more other participant nodes that implement a corresponding file system. In other examples, the file system 114 may include a network storage or some other storage system accessed by the participant nodes of the distributed ledger network 104.

The file system 114 may store one or more models. The models stored in the file system may be accessed based on a corresponding link. A link may include information that triggers access to one or more models stored on the file system 114. The link may include an address, such as an internet protocol (IP) address, a Hyper Text Transfer Protocol (HTTP) link, a File Transfer Protocol (FTP) link, a directory, a file name, a memory address, and/or other information that identifies one or more models. In some examples, the link may include instructions, such as Hyper Text Markup Language (HTML) instructions, that, when executed, cause one or more models to be accessed and/or downloaded.

The system may further include a public key infrastructure 116. The public key infrastructure 116 may include roles, policies, procedures, and repositories for digitally signing information based on public key encryption. For example, the participant node 102 may be assigned a public key. The public key infrastructure may associate the public key with an identifier of the participant node 102. Information provided to the participant node 102 may be encrypted with the public key. The participant node may decrypt the information based on a private key that is paired with the public key.

In various examples, the system may execute federated learning based on a distributed federated learning (DFL) smart contract 118. The blockchain 106 may include the distributed federated learning (DFL) smart contract. The DFL smart contract 118 may be replicated on local blockchains stored on the respective participant nodes of the distributed ledger network 104. Accordingly, the participant nodes of the distributed ledger network 104 may access local copies of the DFL contract. Additional description and examples of the DFL smart contract 118 are discussed in reference to FIG. 2 below.

To facilitate federated learning of between the participant nodes of the distributed ledger network 104, the blockchain 106 may include one or more transition tokens 120. For example, participant nodes of the distributed ledger network 104 may generate one or more transition tokens. Additional description and examples of the transition tokens are discussed in reference to FIG. 3A below. Alternatively or in addition, the blockchain 106 may include one or more vote tokens 122. Participant nodes of the distributed ledger network 104 may generate vote tokens to reach consensus regarding the validity of aggregated models. Additional description and example of vote tokens are described in reference to FIG. 3B below.

Figure 2:
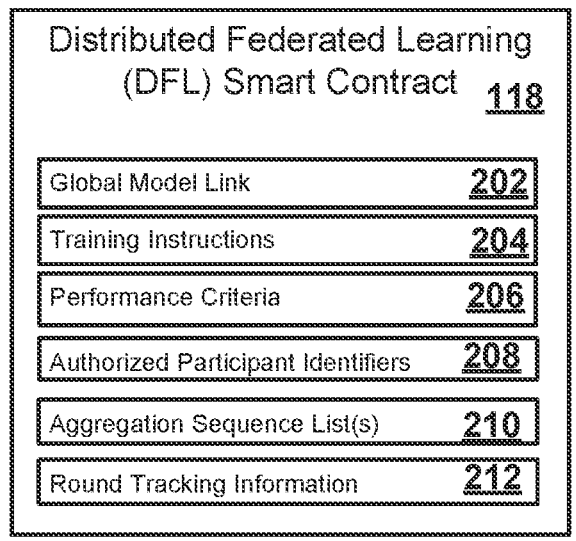
FIG. 2 illustrates an example of a distributed federated learning (DFL) smart contract.

FIG. 2 illustrates an example of a DFL smart contract 118. The DFL smart contract 118 may include a model link 202. The model link 202 may include a link to access a global model for a current round. The global model may include a model designated for further training. For example, the global model may be stored on the file system 114 (FIG. 1). One or more participant nodes may access the global model based on the link and train the global model. The training may occur off-chain. In other words, the training of the global model may be performed separately and independently by each of the participant nodes that wish to join the DFL smart contract 118. When the participants agree on a new aggregated model for a round, the model link will be updated to point to the new aggregated model. Thus, the new aggregated model will be designated as the global model.

The DFL smart contract 118 may include training instructions 204. The training instructions 204 may include logic, such as executable logic and/or machine-executable instructions. Alternatively or in addition, the training instructions 204 may include enumerations and/or parameters for machine learning. For example, the training instructions 204 may include parameters to perform machine learning (i.e. number of training interactions, machine learning type, training data schema, etc). A particular participant node may access the training instructions 204 from the DFL smart contract 118. The machine learning framework 110 (FIG. 1) may train or further train a global model based on the training instructions 204.

The DFL smart contract 118 may include performance criteria 206. The performance criteria 206 may include acceptance criteria that establishes tolerated performance of a model. For example, the performance criteria 206 may include variable(s), threshold value(s) and/or operator(s). An example of the performance criteria 206 may be P>80% where P is a performance measure for a machine learning model and 80% is a predefined probability threshold. In other examples, the performance criteria 206 may include additional or alternative variables, operations, and/or thresholds.

The DFL smart contract 118 may include authorized participant identifiers 208. The authorized participant identifiers 208 may include identifiers of the participant nodes that are parties to the DFL smart contract 118. In other words, the participant identifiers may include authorized peers that have further trained on a model and want to participate in the aggregation process. In some examples, one or more participant nodes may join the DFL smart contract. For example, the participant node 102 of the distributed ledger network 104 may join the DFL smart contract 118 by adding an identifier to of the participant node 102 to the participant identifiers 208. In some examples, the DFL smart contract 118 may restrict participant nodes from being added to the authorized participant identifiers 208 during execution of round of aggregation. In between rounds, (prior to the start of a round or after the round is completed) additional participant identifiers may be added to the authorized participant identifiers 208. In some examples, the DFL smart contract 118 may restrict a round from beginning until a predetermined number of participant identifiers are included in the authorized participant identifiers 208.

The DFL smart contract 118 may include an aggregation sequence list 210. The aggregation sequence list 210 may include an ordered set of participant identifiers 208. The particular order of the participant identifiers 208 may represent an order in which the participant nodes are to aggregate the trained models. Participant nodes that are parties to the DFL smart contract 118 may access the aggregation sequence list to determine when aggregation should be executed.

An example of the aggregation sequence list 210 may include [A, B, C]. The letters A through C (A-C) may represent identifiers of participant nodes that are parties to the DFL smart contract. Each of the participant nodes may separately and independently train a global model based on private training data. One or more nodes may initiate aggregation. Based on the aggregation sequence list [A, B, C], participant node A may send a trained model to the participant node B. Participant node B may aggregate A's trained model and B's trained model and then send the aggregated model to node C, and so on.

In some examples, one or more aggregation leaders may be selected from the authorized participant identifiers. An aggregation leader may include a designated participant node that starts and/or finishes the aggregation sequence based on the aggregation sequence list. The aggregation leader(s) may be randomly selected for a round. For example, B is the aggregation leader of the participant list [A, B, C, D, E], so the aggregation sequence list for B will be [C, D, E A, B], at B the aggregation process will be considered finished.

It should be appreciated that multiple aggregation leaders may be selected in a round, for example, the DFL smart contract 118 may include multiple aggregation sequence lists. Each of the aggregation sequence lists may specify a different order for the participant identifiers 208. Each aggregation sequence list may result in generation of a different aggregated model. In some examples, the participant nodes may up vote and/or down vote the aggregated models to identify which model to accept. The accepted model may be applied as the global model in future federated learning sessions. For example, the model link 202 may be updated to be the link to the accepted model. Alternatively, a new DFL smart contract may be generated where the model link is the link to the accepted model.

The DFL smart contract may include round tracking information. The round tracking information may include a round number that in incremented in response iteration of federated learning. In some examples, the global model link may be updated in response to each round. For example, the round number may be incremented in response to one or more aggregated models being accepted. For example, in response to the authorized participant nodes aggregating separately trained models into a new aggregated model and then reaching consensus as to the validity of the new aggregated model, the round number may be updated. In some examples, multiple aggregated models may be generated based on separate aggregation sequences. The authorized participant nodes may vote the aggregated models after testing the performance of each of the aggregated models. The global link may be updated and set to point to a highest voted aggregated. The round number may be incremented to designate a new round where the highest voted aggregated model is further trained.

The DFL smart contract 118 may enable distributed learning without a central authority. To perform distributed learning and aggregation based on the DFL smart contract 118, the participant nodes may generate one or more tokens, which are stored on the blockchain 106. A token may be indicative of interactions with the DFL Smart Contract 118 or with other participant nodes. For example, calling logic of the smart contract may generate a token that is stored on the blockchain 106. The token may be replicated on the local blockchains of each participant node of the distributed ledger network 104 based on a consensus protocol.

Figure 3A:
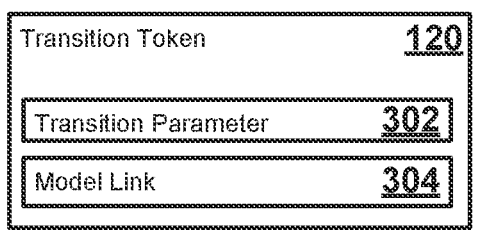
FIGS. 3A and 3B illustrate examples of federated learning tokens.
Figure 3B:
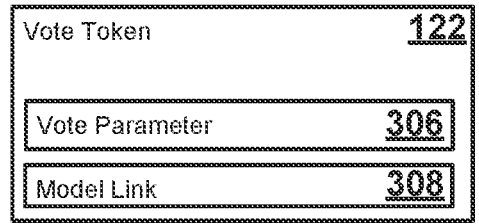

FIGS. 3A and 3B illustrates examples of federated learning tokens. FIG. 3A illustrates an example of the transition token 120. The transition token 120 may represent a transition between participant nodes in an aggregation session. An aggregation session refers to a period in which aggregation is occurring between one or more nodes based on an aggregation sequence list 210 (FIG. 2). When a DFL smart contract 118 includes multiple aggregation sequence lists, multiple aggression sessions may occur in parallel.

The transition token 120 may include information that indicates a model has been aggregated by a particular node in the aggregation sequence list 210 (See FIG. 2). For example, the transition token 120 may include a transition parameter 302. The transition parameter 302 may include information that enables participant node(s) to determine whether to execute aggregation. For example, the transition parameter 302 may include an identifier of a DFL smart contract, an identifier of an aggregation sequence list, identifier(s) of participant node(s) that have previously performed aggregation, and/or identifier(s) of participant nodes that are scheduled to perform aggregation next.

The transition token 120 may include a model link 304. The model link 304 may include a link to a particular model that was aggregated by the participant node 102. For example, the model link may to obtain an aggregated model stored in the file system 114. In examples where the file system 114 is peer-to-peer, the model link may cause the model to be downloaded from the file systems of one or more other participant nodes. In examples where the file system 114 is a network storage, the model link may cause the model to be downloaded from the network storage.

FIG. 3B illustrates an example of the vote token 122. The vote token 122 may represent a vote from a participant node regarding a particular aggregated model. The vote token may include a vote parameter 306. The vote parameter 306 may include one or more parameters for voting on an aggregation model. For example, the vote parameter may include a vote value representative of an up vote and/or down vote of an aggregated model. Alternatively or in addition, the vote parameter may include an identifier of the DFL contract, and identifier of the aggregation sequence list associated with the vote token, and/or an identifier of a participant node that generated the vote token.

In some examples, the vote token may include a model link 308. The model link 308 may include a link to the aggregated model that is the subject of the vote.

Figure 4:
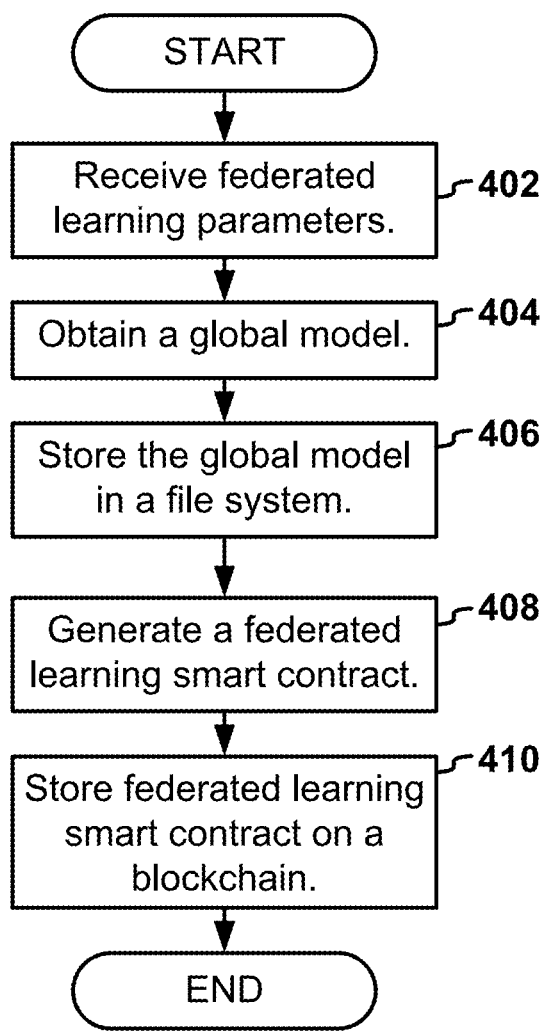
FIG. 4 illustrates a first flow diagram for example logic of a participant node.

FIG. 4 illustrates a first flow diagram for example logic of the participant node 102. The participant node 102 may receive federated learning parameters (402). The federated learning parameters may include parameters that specify how to perform federated learning. For example, the federated learning parameters may include a global model, a link to a global model, one or more participant node identifiers, training instructions, and/or any other information stored in DFL smart contract 118. In some examples, the DFL controller 112, or some server, may generate a graphical user interface (not shown) to receive the federated learning parameters. The graphical user interface may include graphical controllers, fields, and/or other graphical components that receive various parameters.

The DFL controller 112 may obtain a global model (404). A global model may include a model that is designated for training or learning. In some examples, the participant node 102 may generate the global model. For example, the machine learning framework 110 may generate the global model based on training data. In other examples, the participant node 102 may receive the global model. For example, the global model may be communicated to the participant node 102. In some examples, the participant node 102, or some other server, may generate a graphical user interface (not shown) with an interactive control. The interactive control may receive the global model as input.

The DFL controller 112 may store the global model (406). For example, the DFL controller 112 may store the global model in the file system 114. Alternatively or in addition, the DFL controller 112 may generate a link to the global model.

The link may cause the global model to be accessed, downloaded, or otherwise obtained.

The DFL controller 112 may generate the DFL smart contract 118 (408). For example, the DFL controller 112 may receive the federated learning parameters previously discussed. The DFL controller 112 may generate the DFL smart contract 118 based on the parameters.

The DLT platform 108 may store the DFL smart contract 118 on the blockchain 106 (410). For example, the DLT platform 108 may receive the DFL smart contract 118 after the DFL smart contract 118 is generated by the DFL controller 112. The DLT platform 108 may append the DFL smart contract 118 to the blockchain 106. The DFL smart contract 118 may be replicated on the local blockchains of the remaining participant nodes of the distributed ledger network 104. Accordingly, a computer and/or device with access to the smart contract may access the DFL smart contract 118.

Figure 5:
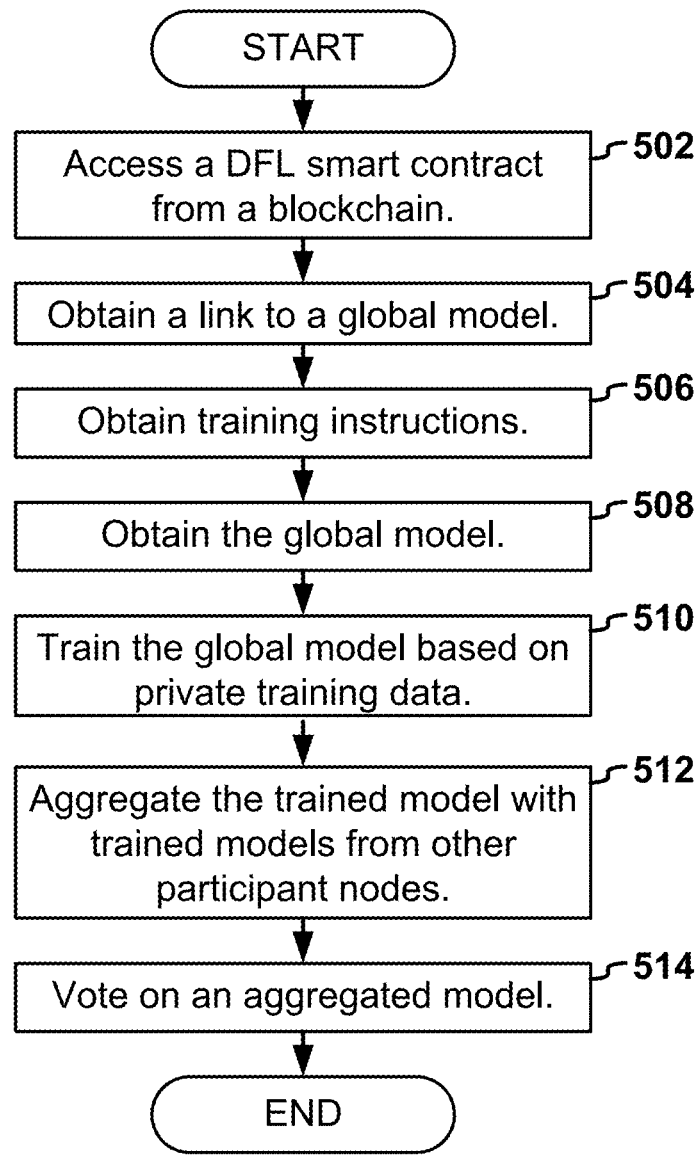
FIG. 5 illustrates a second flow diagram for example logic of a participant node.

FIG. 5 illustrates a second flow diagram for example logic of the participant node 102. The DFL controller 112 may access a DFL smart contract 118 from the blockchain 106 (502). For example, the participant node 102 may have previously generated and/or store the DFL smart contract 118, by, for example, executing the logic described in reference to FIG. 4. Alternatively, another participant node of the distributed ledger network 104 may generate the DFL smart contract 118 and then store the DFL smart contract 118 on a local blockchain. The participant node 102 may receive the federated learning smart contract in response to the federated learning smart contract being replicated on the blockchain 106 of the participant node 102.

The DFL controller 112 may obtain a link to the global model (504). For example, the DFL controller 112 may extract the link from the DFL smart contract 118.

The DFL controller 112 may obtain the training instructions (506). For example, the DFL controller 112 may extract the training instructions from the DFL smart contract 118.

The DFL controller 112 may obtain the global model (508). For example, the DFL controller 112 may access and/or download the global model based on the link. The global model may be stored in a file system, or some other storage, and the link may point to the global model. By way of example, the file system may include a peer-to-peer file system and the DFL controller 112 may cause the model, or respective portions thereof, to be downloaded from one or more participant nodes of the distributed ledger network 104.

The machine learning framework 110 may train the global model based on private training data (510). For example, the machine learning framework 110 may execute the training instructions included in the DFL smart contract 118. Alternatively or in addition, the training instructions 204 may include parameters, such as activation functions, machine learning algorithms, or the like, that the machine learning framework 110 receives to perform the training.

The DFL controller 112 may aggregate the trained model with trained models from other participant nodes (512). For example, the participant node 102 may determine, based on the aggregation sequence list 210 of the DFL smart contract 118, when the participant node is to execute aggregations. In some examples, the participant node 102 may monitor the blockchain 106 for one or more transition tokens. Various examples of aggregation are further described in FIGS. 6-12.

In some examples, multiple aggregation session may occur. For example, the DFL smart contract 118 may include multiple aggregation sequence lists. Aggregation performed according to each of the aggregation sequence lists may result in generation of multiple aggregated models.

The DFL controller 112 may cause the participant node 102 to vote on an aggregated model (514). For example, after an aggregated model is generated based on the federated learning session, the participant node 102, along with other participant nodes that are participating in the federated learning session, may vote on the aggregated model. For example, the participant node 102 may generate a vote token indicative of approval or disapproval a particular aggregated model. To generate the vote, the participant node 102 may execute the model with private test data to generate a performance metric. The participant node 102 may compare the performance metric with the performance criteria 206 included in the DFL smart contract 118. In response to satisfaction of the performance criteria 206, the participant node 102 may generate a vote token indicative of approval of the aggregated model. In response to the performance criteria 206 not being satisfied, the participant node 102 may generate a vote token indicative of disapproval of the aggregated model.

Figure 6:
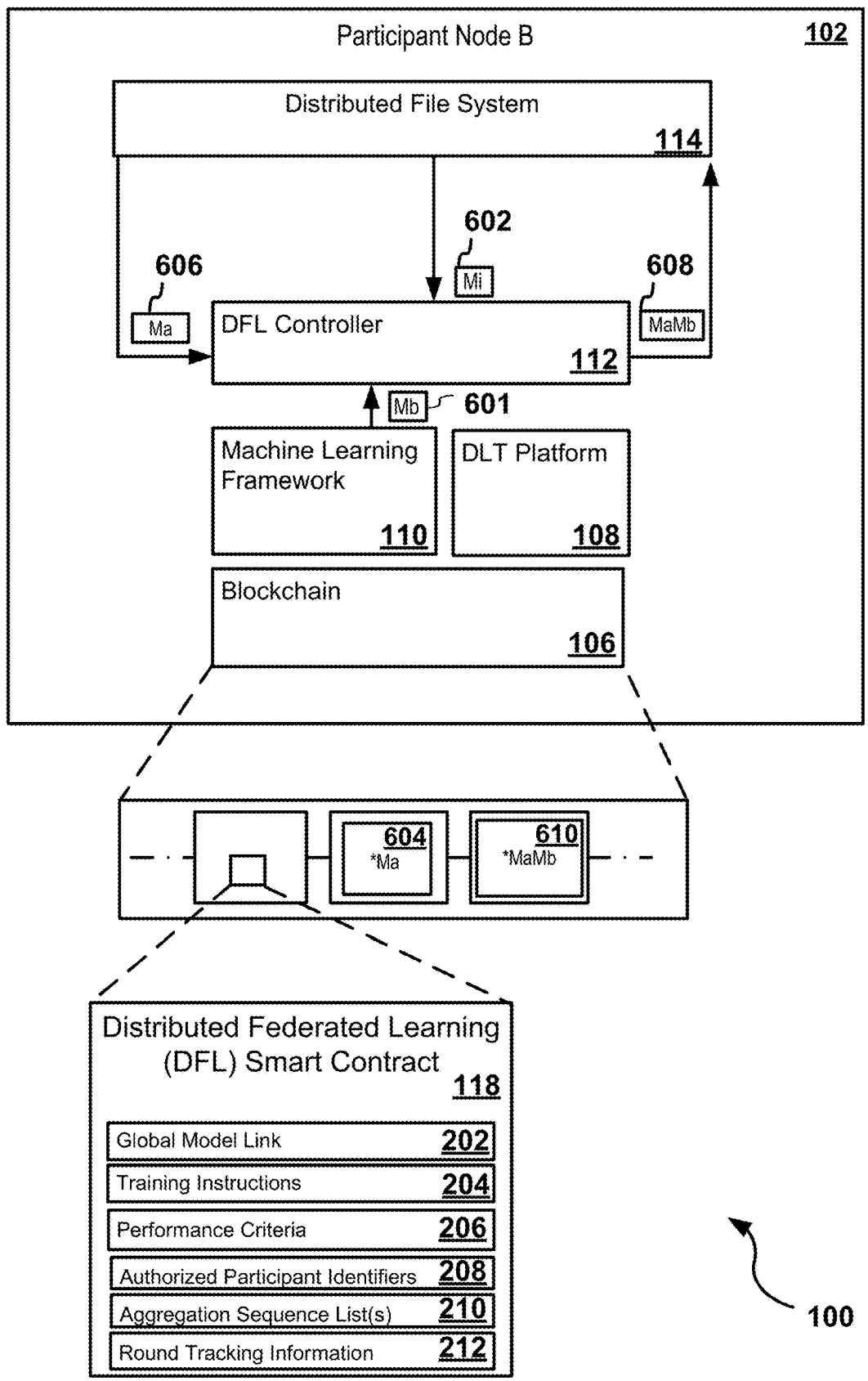
FIG. 6 illustrates a second example of a system.
Figure 7:
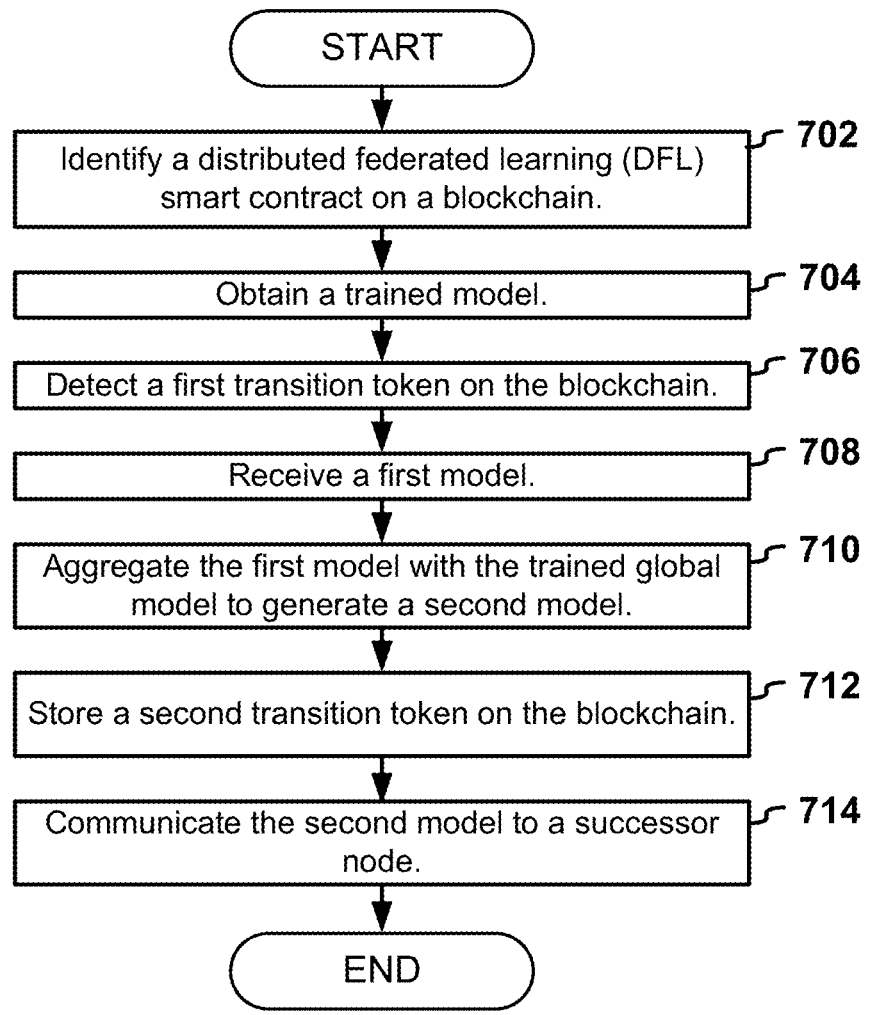
FIG. 7 illustrates a third flow diagram for example logic of a participant node.

FIG. 6 illustrates a second example of the system 100. FIG. 7 illustrates a third flow diagram for example logic of the participant node 102. Reference to FIG. 6 is made throughout the following discussion of FIG. 7.

The DFL controller 112 may identify a DFL smart contract 118 on the blockchain 106 (702). The DFL smart contract 118 may be stored on the blockchain 106 and replicated to other blockchains of the distributed ledger. Accordingly, other participant nodes of the distributed ledger network 104 (FIG. 1) may access the DFL smart contract 118 and to join the DFL smart contract 118.

The DFL controller 112 may obtain the trained model 601 (704). The trained model 601 may be trained by the machine learning framework 110. For example, the DFL controller 112 may obtain a global model 602, from the file system 114. The DFL smart contract 118 may include a link to the global model 602 and/or training instructions 204 for the global model 602. Refer to FIG. 4 for additional operations involved in training the global model 602.

The participant node 102 may detect a first transition token 604 stored on the blockchain 106 (706). The first transition token 604 may include a link to a first model 606. Alternatively or in addition, the first transition token 604 may identify a particular participant node that generated the first model 606 and/or another participant node that is scheduled to respond to the first transition token 604. In other examples, the first transition token 604 may include model.

The participant node 102 may receive a first model 606 (708). The first model may include an aggregation of one or more models trained by other participant nodes that are parties to the DFL smart contract 118. The participant node 102 may download the first model 606 from a file system of another participant node 102 in the distributed ledger network 104 based on a link included in the first transition token 604. Alternatively, the file system 114 may include a cloud storage, network storage, or some other storage that is external the participant node 102, and the participant node 102 may access the first model 606 over a network.

The participant node 102 may aggregate the first model 606 with the trained model 601 to generate a second model 608 (710). As described herein, aggregation between two or more models may include a combination of the two or more models based on an aggregation function. For example, the aggregation function may include an averaging of learned values, such as weights and/or biases, in two or more models.

An example of aggregation may include summing and/or averaging. For example, Participant A may train a model to include a weight matrix [2,2,6], Participant B may train a model to include a weight matrix [5,5,9] and Participant C may train a model to include a weight matrix [8,8,6]. In the aggregation process, these weight matrices are summed up and becomes [15,15,21]. Then, the summed matrix is averaged and becomes [5,5,7].

The participant node 102 may store a second transition token 610 on the blockchain 106 (712). The second transition token 610 may be indicative of the second model 608. For example, the second transition token 610 may include a link to access the second model 608 from the file system 114. Alternatively, the second transition token 610 may include the second model 608.

The participant node 102 may communicate the second model 608 to a successor node (714). For example, the DFL controller 112 may store the second model 608 on the file system 114. The successor node may access the second model 608 from the file system 114. The successor node may be a participant node identified in the aggregation sequence list 210. The successor node may further aggregate the second model 608 with an additional model. For example, the successor node may detect the second transition token 610 on a local, replicated blockchain for the distributed ledger network 104. In response to detecting the second transition token 610, the successor node may aggregate the second model 608 with another model.

Figure 8:
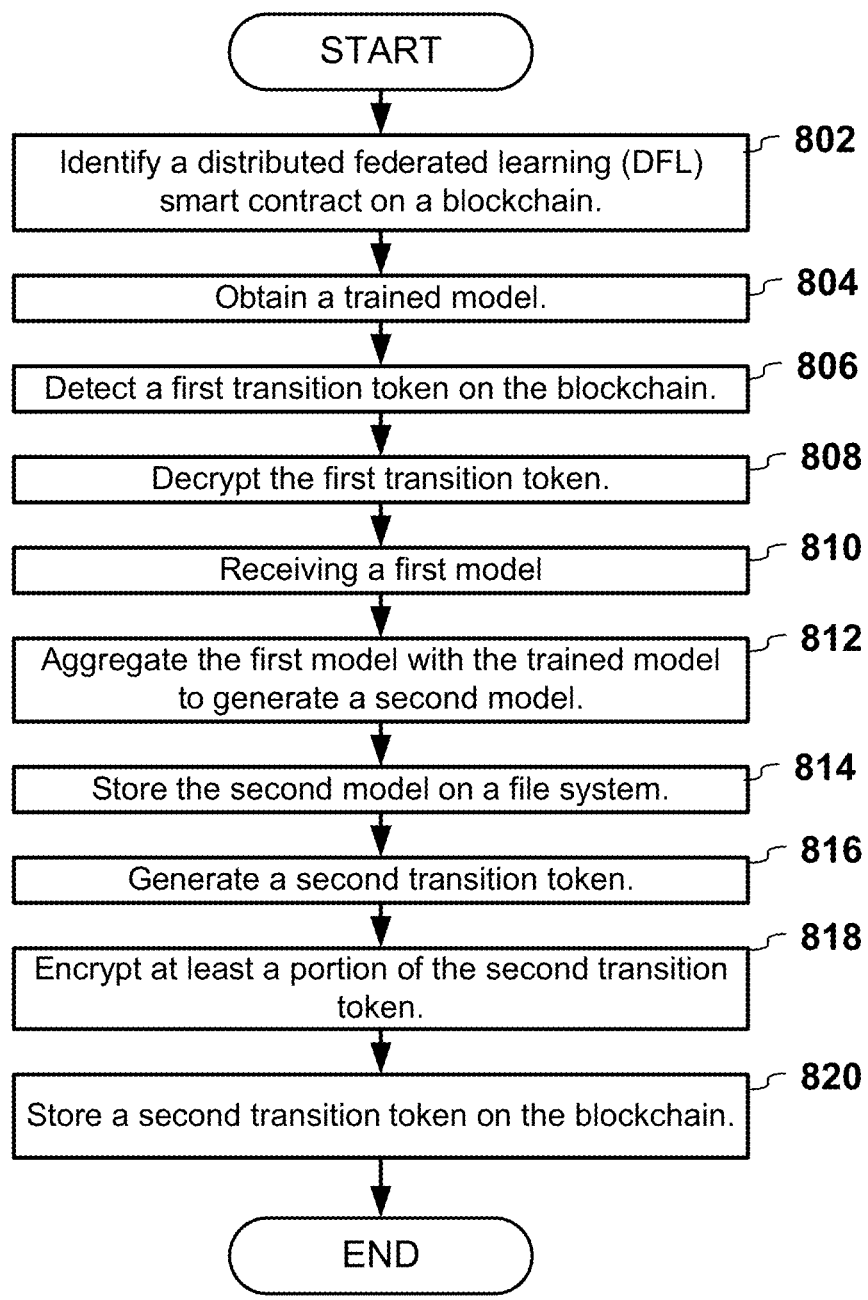
FIG. 8 illustrates a fourth flow diagram for example logic of a participant node.

FIG. 8 illustrates a second flow diagram for example logic of the participant node 102. Reference to FIG. 6 is made throughout the following discussion of FIG. 8.

The participant node 102 may identify a DFL smart contract 118 on the blockchain 106 (802). The participant node 102 may obtain a trained model 601 (804). Participant node 102 may detect the first transition token 604 on the blockchain 106 (806). Operations 802-806 may substantially mirror operations 702-708 described in reference to FIG. 7.

In some examples, the first transition token 604 may be encrypted. For example, a predecessor node identified in the aggregation sequence list 210 of the DFL smart contract 118 may encrypt the first transition token 604, or a portion thereof, based on a public key of the participant node 102. Accordingly, at least a portion of the content of the aggregation token may remain private, even when the first token is stored on a public blockchain.

The participant node 102 may decrypt the first transition token 604, or a portion thereof (808). For example, the participant node 102 may access a private key for the participant node 102. The private key may have been previously paired with the public key for the participant node 102. The participant node 102 may decrypt the first transition token 604, or a portion thereof, based on the private key. For example, the first transition token 604 may include a hash of a link to the first model 606 and the participant node 102 may identify the link based on the private key for the participant node 102.

The participant node 102 may receive the first model 606 (810). For example, the first transition token 604 may include a link to the first model 606. The participant node 102 may access the first model 606 based on the link.

The participant node 102 may aggregate the first model 606 with the trained model 601 to generate the second model 608 (812). For example, the participant node 102 may aggregate the first model 606 with the trained model 601 as described in reference to operation 710 described in reference to FIG. 7.

The participant node 102 may store the second model 608 on the file system 114 (814). For example, the participant node 102 may upload the second model 608 to the file system. The participant node 102 may generate a link to the second model 608.

The participant node 102 may generate a second transition token 610 (816). The second transition token 610 may include the link to the second model 608. The successor node may be identified based on the aggregation sequence list 210 of the smart contract. For example, an identifier of the successor node may be located after an identifier for the participant node 102.

The participant node 102 may encrypt at least a portion of the second transition token 610 (818). For example, the participant node 102 may encrypt the link to the second model 608. The encryption may be based on a public key of a successor node. For example, the participant node 102 may identify the successor node based on the aggregation sequence list 210 of the smart contract. For example, the participant node 102 may access the public key from the public key infrastructure 116 (FIG. 1). For example, the public key infrastructure 116 (FIG. 1) may be queried for the public key with the identifier the successor node as a query parameter.

The participant node 102 may store the second transition token 610 on the blockchain 106 (820). The successor node may access the second transition token 610. The successor node may decrypt the second transition token 610 based on a private key that is paired with the public key for the participant node 102. The successor node may access the second model 608 from the file system 114 based on the second access token. For example, the successor node may access the second model 608 based on the link for the second model 608.

Figure 9:
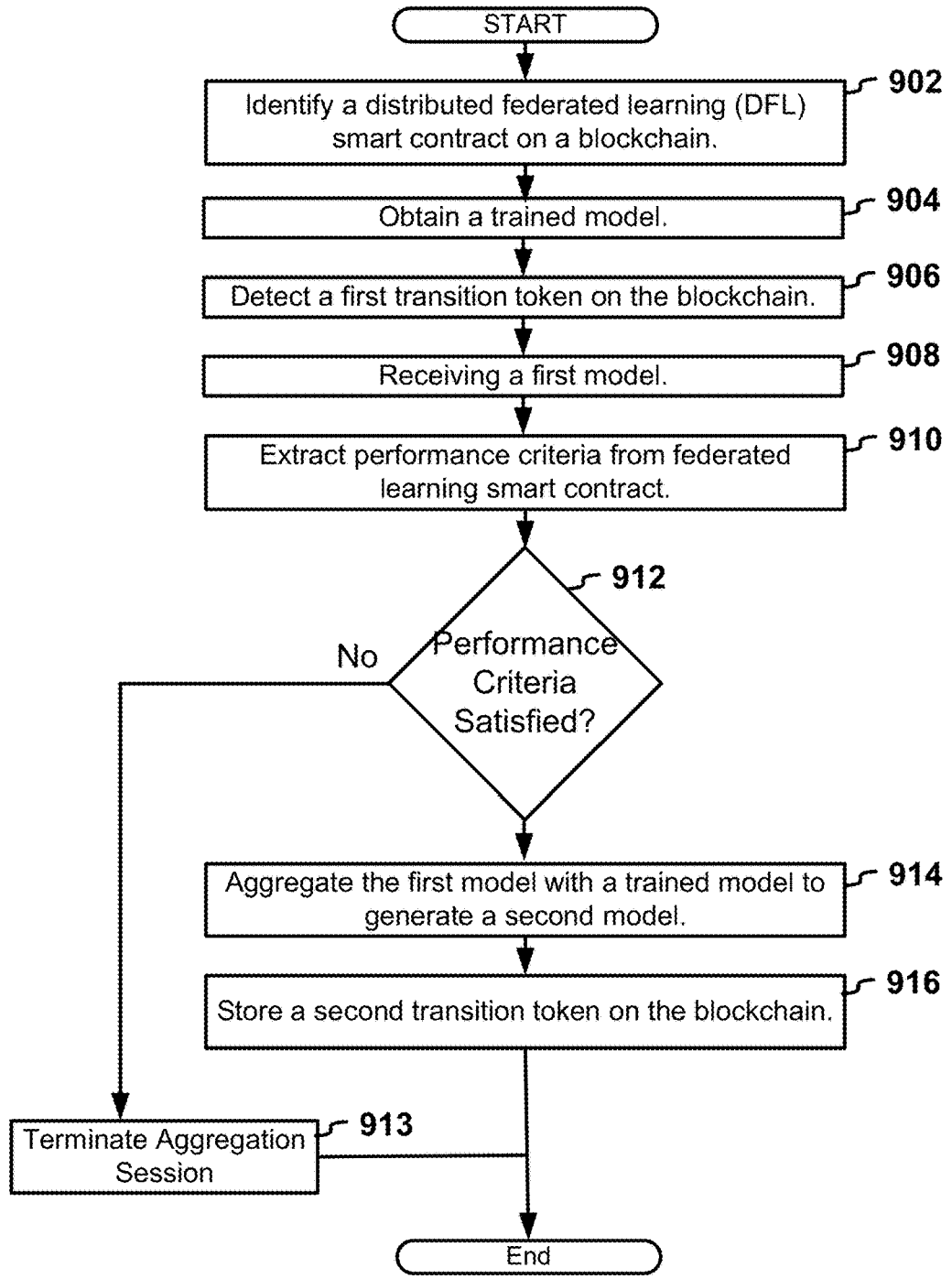
FIG. 9 illustrates a fifth flow diagram for example logic of a participant node.

FIG. 9 illustrates fifth flow diagram for example logic of the participant node 102. Reference to FIG. 6 is made throughout the following discussion of FIG. 9. The participant node 102 may identify a DFL smart contract 118 on the blockchain 106 (902). The participant node 102 may obtain a trained model 601 (904). The participant node 102 may detect the first transition token 604 on the blockchain 106 (906). The participant node 102 may receive a first model 606 (908). Operations 902-908 may substantially mirror operations 702-708 described in reference to FIG. 7.

The DFL controller 112 may extract the performance criteria 206 from the DFL contract (910). The DFL controller 112 may determine whether the performance criteria 206 is satisfied (912). For example, the machine learning framework 110 may receive the model and the test data as parameters and generate a performance metric indicative of one or more inferences based on the model and test data. The DFL controller 112 may compare the performance metric with one or more thresholds included in the performance criteria 206.

In response to the performance criteria 206 not being satisfied (912, NO), the DFL controller 112 may terminate an aggregation session (913). For example, if the performance criteria 206 is not satisfied, one or more predecessor nodes identified in the aggregation sequence list 210 may have improperly trained or aggregated the data, and the aggregation session may be hauled to prevent poisoning the global model 602 identified in the DFL smart contract 118.

In response to the performance criteria 206 being satisfied (912, YES), the DFL controller 112 may aggregate the first model 606 with the trained model 601 to generate a second model 608 (914). The DFL controller 112 may store a second transition token 610 on the blockchain 106 (916). A successor node identified in the aggregation sequence list 210 of the DFL smart contract 118 may detect the second transition token 610 a further aggregate the second model 608 with an additional model trained by the successor token. The successor node may verify the accuracy of the second model 608 based on the same performance criteria (i.e. the performance criteria 206 accessed from the DFL smart contract 118).

Figure 10:
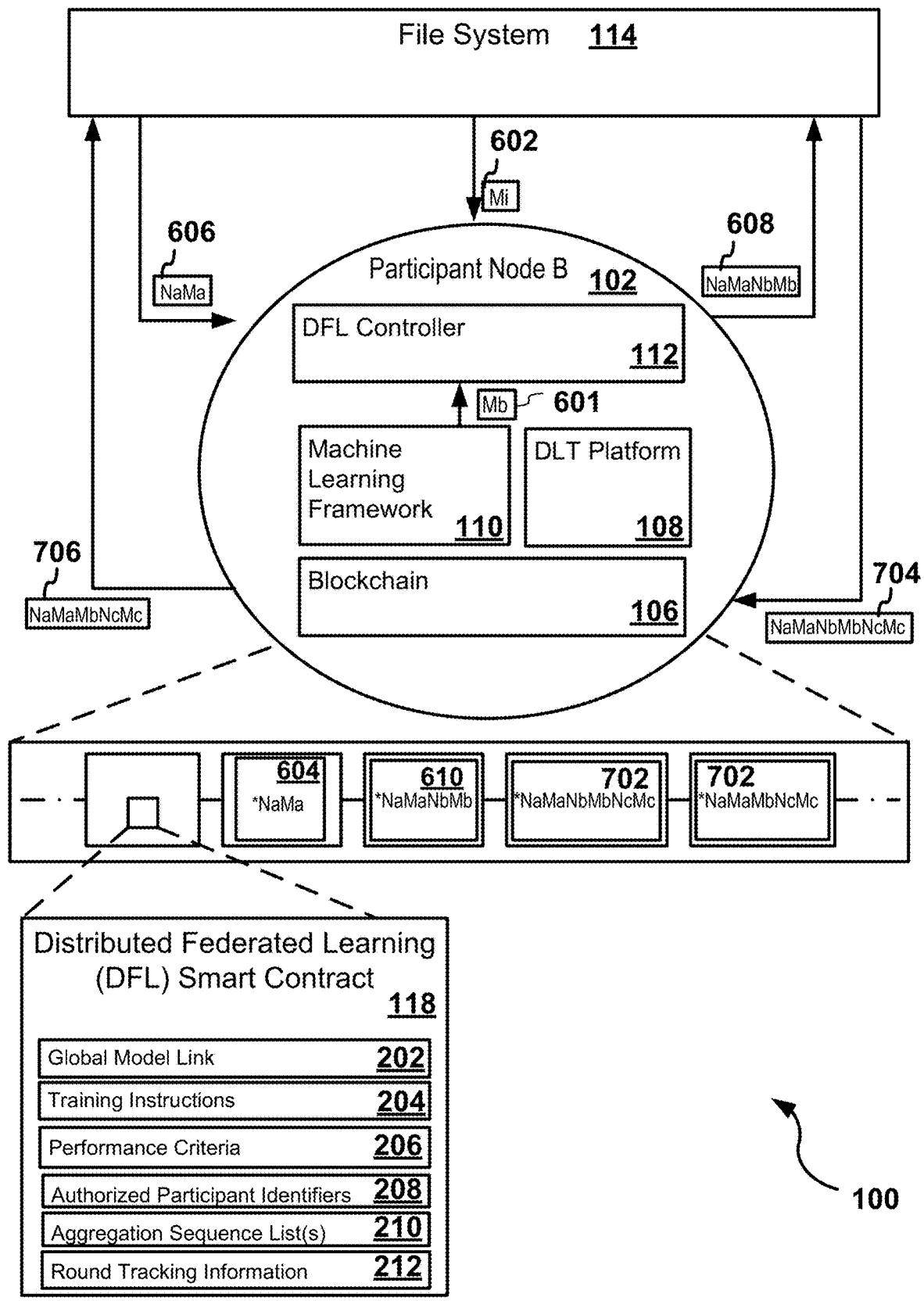
FIG. 10 illustrates a third example of a system.

FIG. 10 illustrates a third example of the system 100. As illustrated in FIG. 10, the file system 114 may be located external to the participant node 102. Accordingly, the participant node 102 and other participant nodes of the distributed ledge network may access models from the file system 114. In other examples, each participant node may include a local instance of the file system 114, and the participant nodes may share the models based on peer-to-peer communications.

Figure 11:
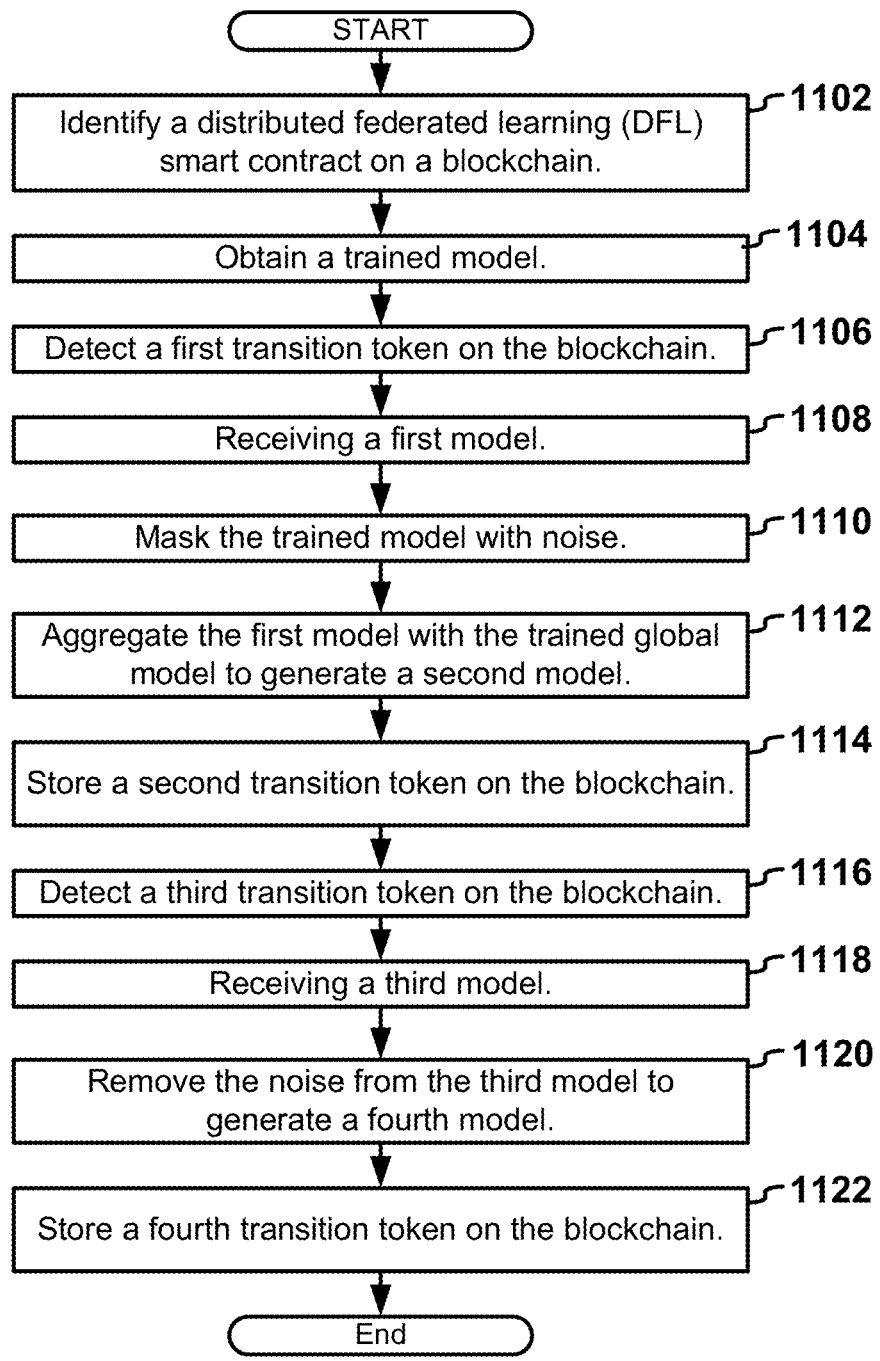
FIG. 11 illustrates sixth flow diagram for example logic of a participant node.

FIG. 11 illustrates sixth flow diagram for example logic of the participant node 102. Reference to FIG. 10 is made throughout the following discussion of FIG. 11.

The participant node 102 may identify the DFL smart contract 118 on the blockchain 106 (1102). The participant node 102 may obtain a trained model 601 (1104). The participant node 102 may detect a first transition token (1106). The participant node 102 may receive the first model 606 (1108). Operations 1102-1108 may substantially mirror operations 702-708 described in reference to FIG. 7.

The DFL controller 112 may mask the trained model 601 (1110). For example, the DFL controller 112 may apply noise filter values to the learned parameters of the trained model 601. The noise filter values may include random noise values that are combined with learned parameters to obscure the learned parameters of the trained model 601. Thus, sensitive information in the trained model 601 may be hidden. The noise filter values are selected in a manner that preserves predictive performance of the masked model, within an acceptable tolerance. For example, predictions generated with the masked model may satisfy the performance criteria 206 included in the DFL smart contract 118.

By way of example, a trained model 601 may include weights and biases in the form of matrices. If matrixes are communicated with unmasked information, it may be possible to deduce information about the private data used to train the model and obtain these weights. Thus, a noise value may be generated to mask the matrices.

In some examples, the noise value may be added to the to the trained model 601 to generate the masked model. For example, the Node B may access the trained model 601, which is composed of weights and biases [2,2,6] and the generated noise is [−0.1, 0.2, −0.]. Node B's masked update is the sum of these 2 matrices: [1.9, 2.2, 5.8].

The noise value may be sufficiently small to have a correct accuracy if the model is tested while masking the true values of weights and biases. In some examples, the noise values may include a Gaussian noise where the noise value is generated based on tunable parameters. For example, the table parameters may include a mu and/or a sigma (e.g. 0 and 0.4 may generate values randomly between −0.400 and 0.400, 4 and 0.1 may generate values randomly between −3.900 and 4,100).

In some examples, the noise value may be applied to the weights and biases by adding the noise value (i.e. noise matrix) to the trained model 601. Then, a performance metric for the masked model is calculated based on test data and the masked model. The performance metric is compared with a performance metric for the unmasked model. The performance metric for the masked model and the performance metric for the unmasked model are compared based on a predetermined criteria, such as the performance criteria 206 of the DFL smart contract 118. If the criteria is not satisfied, the noise value and the masked model may be regenerated and retested until a performance metric is generated that satisfies the performance criteria 206. An example of satisfaction of the criteria includes a maximum 2% difference for the masked model and unmasked model. Alternatively or in addition, an example of satisfaction of the criteria includes the masked model having an accuracy in a range [88%-92%], etc.

The participant node 102 may aggregate the masked model and the first model 606 to generate the second model 608 (1112). The participant node 102 may store the second transition token 610 for the second model 608 on the blockchain 106 (1114).

The operation 1102 through operation 1114 may be sequentially repeated by successor node(s) with successively aggregated data until all of the nodes have aggregated corresponding masked models into an aggregated model. After all of the participant nodes identified in the DFL smart contract have completed aggregation based on masked models, each of the participant nodes may begin removing the masks and re-aggregating.

The participant node 102 may detect a third transition token 702 (1116). The third transition token 702 may be generated by the successor node and stored on a blockchain local to the successor node. Since the successor node is included in the distributed ledger network 104, the local blockchain of the participant node 102 may be updated with the third transition token 702 for the third aggregated model 704. The third transition token may be indicative of a third aggregated model 704. The third aggregated model may include an aggregation of multiple models generated by the successor node and other participant nodes identified by the DFL smart contract 118.

The participant node 102 may receive a third aggregated model 704 (1118). For example, the participant node 102 may receive the third aggregated model 704 based on the third transition token 702. The third transition token 702 may include a link for the third aggregated model 704 and the participant node 102 may download the third aggregated model 704 from the file system based on the link.

The participant node 102 may remove noise attributable to the masked model to generate a fourth model 706 (1120). For example, once the noise is generated, it is stored so it can be used to remove the masked sum model later in the process. From a mathematical point of view, the noise may be removed from the masked model based on subtraction of the terms of matrices. For example, Node B may access a trained model 601 composed of weights and biases [2,2,6] and the generated noise is [−0.1, 0.2, −0.2]. Node B's masked update is the sum of these 2 matrices: [1.9, 2.2, 5.8]. Node B may add this sum to a first model 606 received from a previous node in the aggregation sequence. In response to the third aggregated model 704 [2.4, 2.5, 4.9] being generated by a subsequent node in the aggregation sequence, Node B may subtract the noise to generate the fourth aggregated model 706 [2.5, 2.3, 5.1].

The participant node 102 may store a fourth transition token 708 on the blockchain 106 (1122). The fourth transition token 708 may include a link to the fourth model 706. Remaining nodes in the aggregation sequence list 210 may repeat operations 1116-1122 until there an aggregated model is generated without masked information. The participant nodes identified in the DFL smart contract 118 may vote to determine whether the final aggregated model is acceptable.

Figure 12:
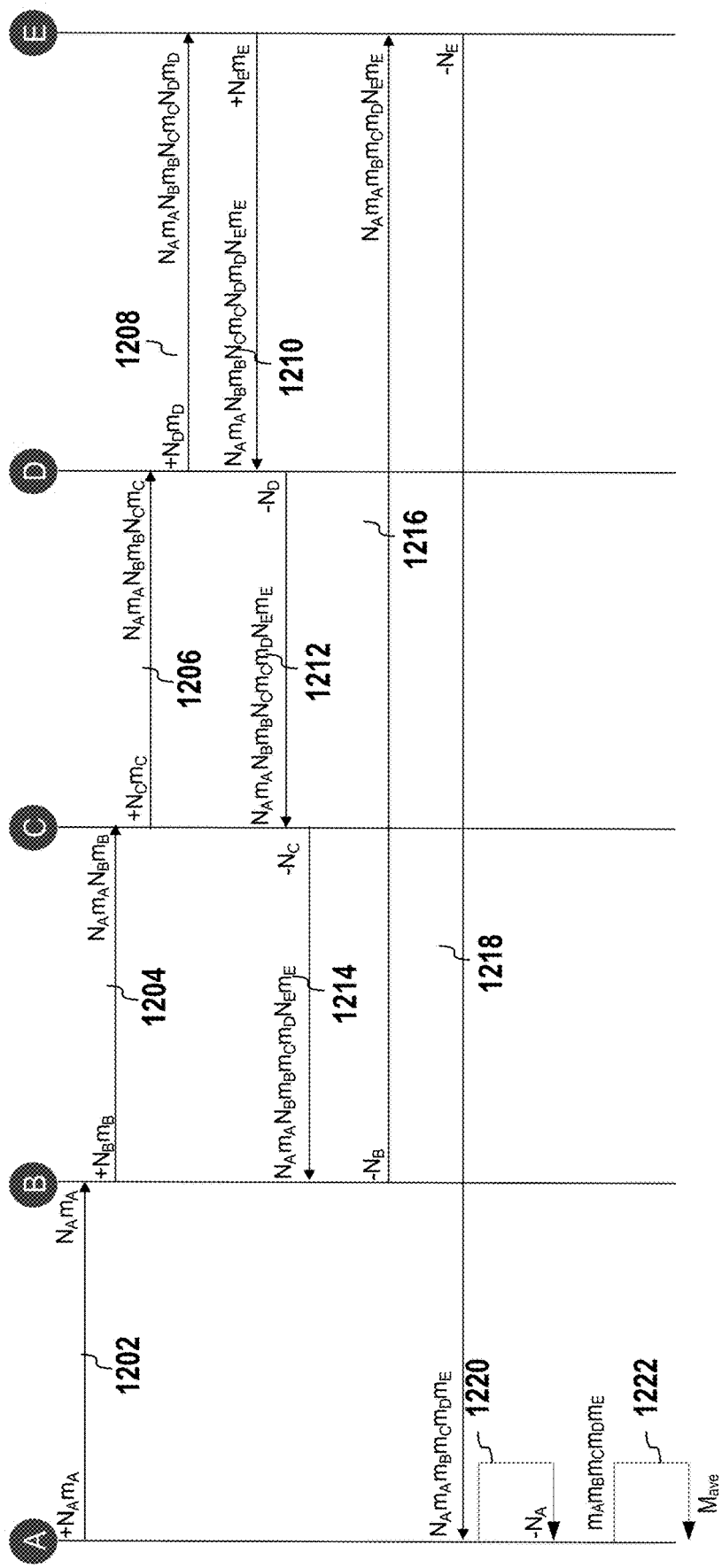
FIG. 12 illustrates an example of a sequence diagram for an aggregation sequence.

FIG. 12 illustrates an example of sequence diagram for an aggregation sequence list. Participant nodes A-E may be separate instances of the participant node 102 shown in FIGS. 1, 6, and 10. The participant nodes A-E may be included in a distributed ledger network 104. Thus, each of the participant nodes A-E may include a local blockchain that is replicated according to a consensus protocol. In addition, each of the participant nodes A-E may include a local instance of the DFL controller 112, the DLT platform 108, the blockchain 106 and/or the file system 114.

Each of the participant nodes A-E may train a global model based on separate training data. In some examples, a DFL smart contract 118 may include a link to the global model and/or training instructions for training the global model. The participant nodes A-E may respectively generate trained models Ma, Mb, Mc, Md, and Me.

The various training data accessed by the participant nodes A-E may include private or sensitive information. Thus, sharing the training data, or the models Ma, Mb, Mc, Md, Me trained based on the training data, may be undesirable. The aggregation sequence list specified by the DFL smart contract may ensure that the models Ma, Mb, Mc, Md, Me are aggregated without revealing or sharing the values of Ma, Mb, Mc, Md, Me. By way of example, the aggregation sequence list for the participant nodes A-E may include [A, B, C, D, E].

The participant nodes A-E may aggregate the models based on the aggregation sequence list 210. For example, participant node A may determine that participant node A is the first participant node in the aggregation sequence list. In response, participant node A may begin the aggregation sequence list. Participant node A may generate a first masked model NaMa. For example, Participant node A may add together a noise value Na with a trained model Ma. Participant node A may generate a first transition token for the first aggregated model NaMa and store the transition token on a local blockchain for the distributed ledger. The transition token may be replicated based on consensus between the participant nodes A-E.

Aggregation may transition from participant node A to participant node B. (1202). Participant node B may detect the first transition token on a local blockchain. The first transition token may include a link for the aggregated model NaMa. Participant node B may receive the aggregated model NaMa based on the link. Participant node B may generate masked model NbMb. For example, Participant node B may add together a noise value Nb with the masked model Mb. Participant node B may aggregate masked model NbMb with aggregated model NaMa to form the aggregated model NaMaNbMb. For example, participant node B may add together the models NaMa and NbMb to form NaMaNbMb. Participant node B may store the aggregated model NaMaNbMb in a file system and append a transition token for the aggregated model NaMaNbMb on a blockchain for a distributed ledger that is replicated between the participant nodes A-E.

The above sequence may repeat for successor participant nodes C-E. For example, aggregation may transition from participant node B to participant node C (1204). Participant node C may receive the aggregated model NaMaNbMb and generate the aggregated model NaMaNbMbNcMc. Aggregation may transition from participant node C to participant node D (1206). Participant node D may receive the aggregated model NaMaNbMbNcMc and then generate the aggregated model NaMaNbMbNcMcNdMd. Aggregation may transition from participant node D to participant node E (1208). Participant node E may receive the aggregated model NaMaNbMbNcMcNdMd and generate the aggregated model NaMaNbMbNcMcNdMdNeMe (i.e. the sum of the respective trained models and noise values)

Participant node E may determine, based on the aggregation sequence list of the DFL smart contract, that no additional participant nodes will aggregate masked data. For example, participant node E may determine that participant node E is the last identified participant node in the aggregation sequence list of the DFL smart contract. Accordingly, participant node E may generate a transition token that identifies participant D as the next participant node to receive the aggregated model NaMaNbMbNcMcNdMdNeMe. Alternatively or in addition, participant node D may automatically detect that participant node D is the next participant node to perform aggregation.

Aggregation may transition from participant node E to participant node D (1210). Participant node D may receive the aggregated model NaMaNbMbNcMcNdMdNeMe. Participant node D may remove the noise Nd to generate the aggregated model NaMaNbMbNcMcMdNeMe. For example, participant node D may subtract the noise Nd from the aggregated model NaMaNbMbNcMcNdMdNeMe to generate the aggregated model NaMaNbMbNcMcMdNeMe. Participant node D may store the aggregated model NaMaNbMbNcMcMdNeMe in a file system and then store a transition token on a blockchain, which is replicated across the distributed ledger to the other participant nodes.

Aggregation may continue to transition between participant nodes and the remaining participant nodes may remove noise Nc, Nd, and Ne, and Na. For example, aggregation may transition from participant node D to participant node C (1212). Participant node C may remove noise Nc. Aggregation may transition from participant node C to participant node B (1214). Participant node B may remove noise Nb. Aggregation may transition from participant node B to E (1216). Participant node B may remove noise Ne. Aggregation may transition from participant node E to participant node A (1218). Participant node A may remove noise Na (1220). After the participant nodes A-E remove the noise Na, Nb, Nc, Nd, and Ne, may generate the aggregated model MaMbMcMdMe.

Participant node A may average the aggregated model MaMbMcMdMe to generate a final aggregated model $M_{ave}$. Participant node A may store the aggregated model in the file system. Participant node A may generate a final transition token. The final vote token may include a link to the final aggregated model $M_{ave}$. The participant nodes A-E may vote on the validity of the aggregated model $M_{ave}$ in response to detection of the final aggregated model. In response to $M_{ave}$ being verified, the participant nodes A-E may update the global model link in the DFL smart contract to point to $M_{ave}$ for future rounds.

The logic illustrated in the flow diagrams may include additional, different, or fewer operations than illustrated. Moreover, the system 100 may be implemented with additional, different, or fewer components than illustrated. Each component may include additional, different, or fewer components.

Figure 13:
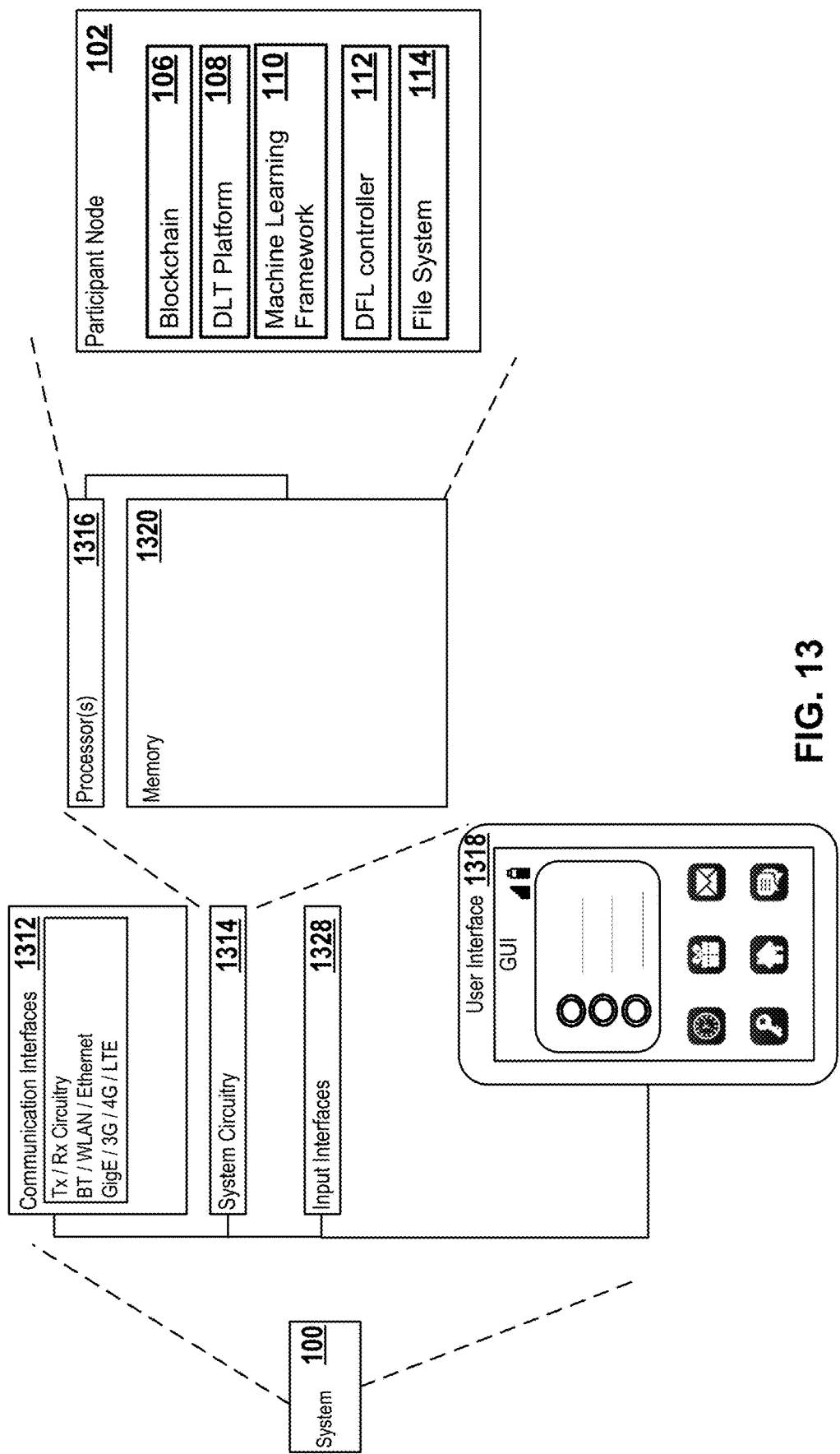
FIG. 13 illustrates a fourth example of a system.

FIG. 13 illustrates a fourth example of the system 100. The system 100 may include communication interfaces 1312, input interfaces 1328 and/or system circuitry 1314. The system circuitry 1314 may include a processor 1316 or multiple processors. Alternatively or in addition, the system circuitry 1314 may include memory 1320.

The processor 1316 may be in communication with the memory 1320. In some examples, the processor 1316 may also be in communication with additional elements, such as the communication interfaces 1312, the input interfaces 1328, and/or the user interface 1318. Examples of the processor 1316 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 1316 may be one or more devices operable to execute logic. The logic may include computer executable instructions or computer code stored in the memory 1320 or in other memory that when executed by the processor 1316, cause the processor 1316 to perform the operations the blockchain 106, the DLT platform 108, the machine learning framework 110, the DFL controller 112, file system 114, the participant node 102, and/or the system 100. The computer code may include instructions executable with the processor 1316.

The memory 1320 may be any device for storing and retrieving data or any combination thereof. The memory 1320 may include non-volatile and/or volatile memory, such as a random access memory (RAM), a read-only memory (ROM), an erasable programmable read-only memory (EPROM), or flash memory. Alternatively or in addition, the memory 1320 may include an optical, magnetic (hard-drive), solid-state drive or any other form of data storage device. The memory 1320 may include at least one of the blockchain 106, the DLT platform 108, the machine learning framework 110, the DFL controller 112, file system 114, the participant node 102, and/or the system 100. Alternatively or in addition, the memory may include any other component or sub-component of the system 100 described herein.

The user interface 1318 may include any interface for displaying graphical information. The system circuitry 1314 and/or the communications interface(s) 1312 may communicate signals or commands to the user interface 1318 that cause the user interface to display graphical information. Alternatively or in addition, the user interface 1318 may be remote to the system 100 and the system circuitry 1314 and/or communication interface(s) may communicate instructions, such as HTML, to the user interface to cause the user interface to display, compile, and/or render information content. In some examples, the content displayed by the user interface 1318 may be interactive or responsive to user input. For example, the user interface 1318 may communicate signals, messages, and/or information back to the communications interface 1312 or system circuitry 1314.

The system 100 may be implemented in many different ways. In some examples, the system 100 may be implemented with one or more logical components. For example, the logical components of the system 100 may be hardware or a combination of hardware and software. The logical components may include the blockchain 106, the DLT platform 108, the machine learning framework 110, the DFL controller 112, file system 114, the participant node 102, the system 100, and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 1320, for example, that comprises instructions executable with the processor 1316 or other processor to implement one or more of the features of the logical components. When any one of the logical components includes the portion of the memory that comprises instructions executable with the processor 1316, the component may or may not include the processor 1316. In some examples, each logical component may just be the portion of the memory 1320 or other physical memory that comprises instructions executable with the processor 1316, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements, which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method, comprising:
    identifying, by a participant node of a distributed ledger network, a distributed federated learning (DFL) smart contract stored on a blockchain for a distributed ledger, the DFL smart contract comprising an aggregation sequence, the aggregation sequence comprising an ordered sequence of a plurality of participant node identifiers, the participant node identifiers corresponding to participant nodes of the distributed ledger network, the aggregation sequence thereby defining an initial participant node and a sequence of successor nodes;
    training an initial model with training data
    detecting, on the blockchain, a first transition token indicative of a first model and the smart contract;
    in response to detection of the first transition token, the initial participant node:
        receiving the first model;
        aggregating the first model with the trained initial model to generate a second model; and
        storing, on the blockchain, a second transition token indicative of the second model,
    wherein a successor node identified in the aggregation sequence is configured to further aggregate the second model with an additional model in response to detection of the second transition token.

2. The method of claim 1, wherein in response to detection of the first transition token indicative of the first model and before aggregating the first model with the trained model, the method further comprises:
    masking the trained model based on noise filter values.

3. The method of claim 2, further comprising:
    detecting, on the blockchain, a third transition token indicative of a third model, the third model generated by the successor node, the third model comprising an aggregation of the second model and at least one additional model;
    in response to detection of the third transition token:
        receiving the third model;
        removing, from the third model, noise attributable to the noise filter values to generate a fourth model; and
        storing, on the blockchain, a fourth transition token indicative of the fourth model.

4. The method of claim 1, wherein the smart contract further comprises a link to a global model, the method further comprising:
    receiving the global model from a source based on the link, the source comprising a network storage and/or at least one of the participant nodes identified in the aggregation sequence.

5. The method of claim 1, wherein the smart contract further comprises training instructions, the method further comprising:
    training the global model based on the training instructions and training data.

6. The method of claim 1, wherein the smart contract further comprises performance criteria, the method further comprising:
    generating a performance metric based on the first model and test data; and
    determining that the performance metric satisfies the performance criteria.

7. The method of claim 1,
    detecting, on the blockchain, a third transition token indicative of a third model generated by at least one of the participant nodes;
    generating a performance metric indicative of performance of the third model based on test data;
    determining that the performance metric satisfies a performance criteria;
    storing, in response to satisfaction of the performance criteria, a vote token on the blockchain indicative of acceptance of the third model.

8. The method of claim 1, wherein at least a portion of the first transition token is encrypted based on a public key for the participant node, the method further comprising:
    decrypting at least the portion of the first transition token based on a private key for the participant node.

9. The method of claim 1, wherein in response to detection of the first transition token, the method further comprises:
    generating the second transition token; and
    encrypting the second transition token based on a public key for the successor node.

10. The method of claim 1, wherein the first transition token comprises a link for obtaining the first model, further comprising:
    accessing, based on the link, the first model from a file system.

11. The method of claim 1, wherein in response to detection of the first transition token, the method further comprises:
    storing the second model on a file system; and
    generating the second transition token, the second transition token comprising a link to the second model stored on the file system.

12. A system comprising:
    a participant node of a distributed ledger network, the participant node comprising a hardware processor, the hardware processor configured to:
    identify a distributed federated learning (DFL) smart contract stored on a blockchain for a distributed ledger, the DFL smart contract comprising an aggregation sequence, the aggregation sequence comprising an ordered sequence of a plurality of participant node identifiers, the participant node identifiers corresponding to participant nodes of a distributed ledger network, the aggregation sequence thereby defining an initial participant node and a sequence of successor nodes;
    generate a trained model by training a global model identified by the smart contract with training data;
    detect, on the blockchain, a first transition token indicative of a first model; and
    in response to detection of the first transition token, causing the initial participant node to:
        receive the first model,
        aggregate the first model with the trained global model to generate a second model, and
        store, on the blockchain, a second transition token indicative of the second model;
    wherein a successor node identified in the aggregation sequence is configured to further aggregate the second model with an additional model in response to detection of the second transition token.

13. The system of claim 12, wherein the hardware processor is further configured to: mask the trained model based on noise filter values.

14. The system of claim 13, wherein the hardware processor is further configured to:
    detect, on the blockchain, a third transition token indicative of a third model, the third model generated by the successor node, the third model comprising an aggregation of the second model and at least one additional model; and
    in response to detection of the third transition token:
        receive the third model,
        remove, from the third model, noise attributable to the noise filter values to generate a fourth model, and
        store, on the blockchain, a fourth transition token indicative of the fourth model.

15. The system of claim 12, wherein the smart contract further comprises a link to a global model and training instructions, wherein the hardware processor is further configured to:
    receive the global model from a source based on the link: arid
    train the global model based on the training instructions and training data.

16. The system of claim 12, wherein the smart contract further comprises performance criteria, wherein the hardware processor is further configured to:
    generate a performance metric based on the first model and test data; and
    determine the performance metric satisfies the performance criteria.

17. The system of claim 12, wherein in response to detection of the first transition token, the hardware processor is further configured to:
    generate the second transition token; and
    encrypt the second transition token based on a public key for the successor node.

18. The system of claim 12, wherein the first transition token comprises a link for obtaining the first model, wherein the hardware processor is further configured to:
    accessing, based on the link, the first model from a file system.

19. A non-transitory computer readable medium comprising:
    a plurality of instructions executable by a processor, the instructions comprising:
    instructions executable by the processor to identify a distributed federated learning (DFL) smart contract stored on a blockchain for a distributed ledger, the DFL smart contract comprising an aggregation sequence, the aggregation sequence comprising an ordered sequence of a plurality of participant node identifiers, the participant node identifiers corresponding to participant nodes of a distributed ledger network, the aggregation sequence thereby defining an initial participant node and a sequence of successor nodes;
    instructions executable by the processor to generate a trained model by training a global model identified by the smart contract with training data;
    instructions executable by the processor to detect, on the blockchain, a first transition token indicative of a first model;
    instructions executable by the processor to receive the first model in response to detection of the first transition token;
    instructions executable by the processor to cause the initial participant node to aggregate the first model with the trained initial model to generate a second model; and
    instructions executable by the processor to store, on the blockchain, a second transition token indicative of the second model,
    wherein a successor node identified in the aggregation sequence is configured to further aggregate the second model with an additional model in response to detection of the second transition token.

20. The non-transitory computer readable medium of claim 19, further comprising
    instructions executable by the processor to mask the trained model based on noise filter values;
    instructions executable by the processor to detect, on the blockchain, a third transition token indicative of a third model, the third model generated by a successor node, the third model comprising an aggregation of the second model and at least one additional model;

instructions executable by the processor to receive the third model in response to detection of the third transition token;

instructions executable by the processor to remove, from the third model, noise attributable to the noise filter values to generate a fourth model; and instructions executable by the processor to store, on a blockchain, a fourth transition token indicative of the fourth model.

* * * * *